350-6.6 SR

XR 3,621,133

[redacted] [redacted] [redacted]

United Sta T73030D

[11] 3,621,133

[72] Inventors Char
Bob

[21] Appl. No. 678,
[22] Filed Oct. 30, 1967
[45] Patented Nov. 16, 1971
[73] Assignee Texas Instruments Incorporated
Dallas, Tex.
Original application Mar. 15, 1965, Ser. No. 439,857, now Patent No. 3,549,800. Divided and this application Oct. 30, 1967, Ser. No. 678,965

[54] LASER DISPLAY
5 Claims, 6 Drawing Figs.

[52] U.S. Cl. .......... 178/7.3, 178/7.6, 178/DIG. 2, 350/6, 350/7, 350/96, 350/285
[51] Int. Cl. .......... H04n 3/08, H04n 9/14
[50] Field of Search .......... 178/6, DIG. 2, 7.3 D; 350/96, 6, 7, 285; 178/7.6, 6, 7.85; 324/97

...ces Cited

TES PATENTS

| | | | |
|---|---|---|---|
| | | ...er | 178/7.6 |
| 2,465,898 | 3/1949 | Martin | 178/7.6 |
| 3,272,917 | 9/1966 | Good | 178/5.4 |
| Re.21,105 | 5/1939 | Round | 178/6 LCR |
| 2,724,995 | 11/1955 | Matner | 178/7.6 |
| 2,920,529 | 1/1960 | Blythe | 350/285 |
| 3,011,124 | 11/1961 | Hermann | 178/7.6 |
| 3,154,371 | 10/1964 | Johnson | 178/7.3 D |
| 3,218,390 | 1/1965 | Bramley | 178/7.85 |
| 3,240,106 | 3/1966 | Hicks | 178/6 LCR |
| 3,255,357 | 6/1966 | Kapany | 178/6 LCR |

*Primary Examiner*—Robert L. Griffin
*Assistant Examiner*—Joseph A. Orsino, Jr.
*Attorneys*—Samuel M. Mims, Jr., James O. Dixon, Andrew M. Hassell, Harold Levine, Rene E. Grossman and John E. Vandigriff

ABSTRACT: A laser display system is disclosed for displaying real time data by modulating a light beam from a laser, converting the beam of light to a curved path of light and transforming the path light into successive straight lines. The straight lines of video information are then projected into a spaced relation to one another to form a display.

3621133
NO OR CLASSIF

INVENTORS
CHARLES E. BAKER
BOB E. MARTEL
BY René E. Grossman

INVENTORS
CHARLES E. BAKER
BOB E. MARTEL
BY René E. Grossman

LASER DISPLAY

This application is a division of application Ser. No. 439,857, filed Mar. 15, 1965, now U.S. Pat. 3,549,800 in the name of Charles E. Baker and entitled "LASER DISPLAY."

This invention relates to projection display systems and more particularly to a display system using a laser light source.

Laser light sources offer advantages not found in conventional light sources, the significant distinguishing properties being: high intensity, spacial coherence, monochromaticity and polarization. Some of these features may be more important than others depending upon the application. For example, the laser's high intensity together with the spacial coherence removes the necessity of using larger aperture optics for efficient energy transfer. At best, perhaps a few percent of the light from a tungsten filament may be used in a conventional transparency projector. Essentially all the light from the laser is usable, and several scanning and light modulation techniques make use of the laser spectral purity or the linear polarization of its output.

It is therefore an object of the invention to provide an improved display system in which a laser light source is employed.

Another object of the invention is to provide a display system in which a laser light beam is modulated and scanned to produce an image which may be projected onto a viewing screen.

Another object of the invention is to provide a display system having improved intensity and resolution.

Another object of the invention is to provide a display which may be more efficiently projected.

Another object of the invention is to provide a display system capable of projecting a television picture of greater size than has been practical heretofore.

Another object of the invention is to provide an apparatus for producing horizontal and vertical scanning of a modulated light beam.

Another object is to provide means for transforming a modulated light beam into a linear horizontal trace of light.

Other objects and features of the invention will be apparent from the following detailed description when read in conjunction with the appended claims and attached drawings, in which:

The laser display system described herein is adapted for the projection of commercially produced television pictures, which requires that the horizontal and vertical scan rates be the same as those used in conventional television equipment. However, this identity of scan rates is not a limiting feature of the invention. A standard TV display normally has 525 active vertical lines, whereas a vertical resolution in excess of 1,000 lines and beyond is possible with the present invention.

Figure 1:
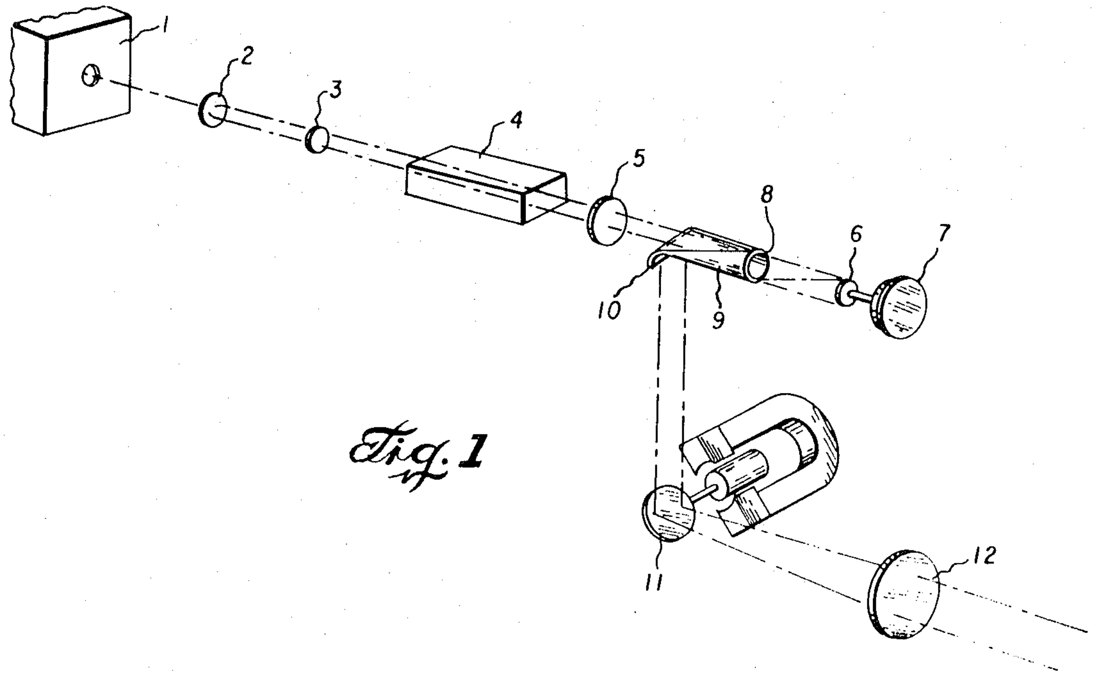
FIG. 1 is a functional layout of the laser display system of the invention.

Referring now to FIG. 1 of the drawings, the basic layout of the complete laser display system is shown. The laser is operated in a hemispherical geometry so that all the output is generated in a single spacial mode. This allows a diffraction-limited optical system to be used, and assures maximum resolution with a limited optical aperture. The lens 2 is used to diverge the light emitted from the laser 1. The light is collimated through lens 3, projected through the modulator 4 and polarizer 5 onto a rotating mirror 6 which is part of the horizontal scanner 7. Because of the motion of the mirror, the modulated light beam is reflected in a circular pattern onto end 8 of the fiber optic device 9.

The horizontal scanner 7 generates a lissajous pattern at 15,750 cycles per second, which is the horizontal TV line rate. This is accomplished by driving the two axes of the scanner with 15,750 -cycles-per-second sine waves which are 90° out of phase. This circular scan pattern is then rectified by fiber optic device 9 into a linear line scan with near zero flyback time. This is possible since the light beam is projected in the circular lissajous pattern from mirror 6 onto the circular portion 8 of fiber optic device 9. The light beam travels through the fibers making up the fiber optic assembly and is projected out the end 10 of the optic fibers onto the oscillating mirror 11. In passing through the fiber optic device 9, the light beam is scattered and emerges as an $f/4$ cone of light. Because of this scattering, the vertical scanner mirror 11 must be considerably larger and turn through a larger angle than the horizontal scanner.

A d'arsonval-type galvanometer is used to produce the vertical scan which is explained hereinafter. The reflection from the mirror 11 is projected through projection lens 12 onto an ordinary light screen (not shown).

Figures 2, 3:
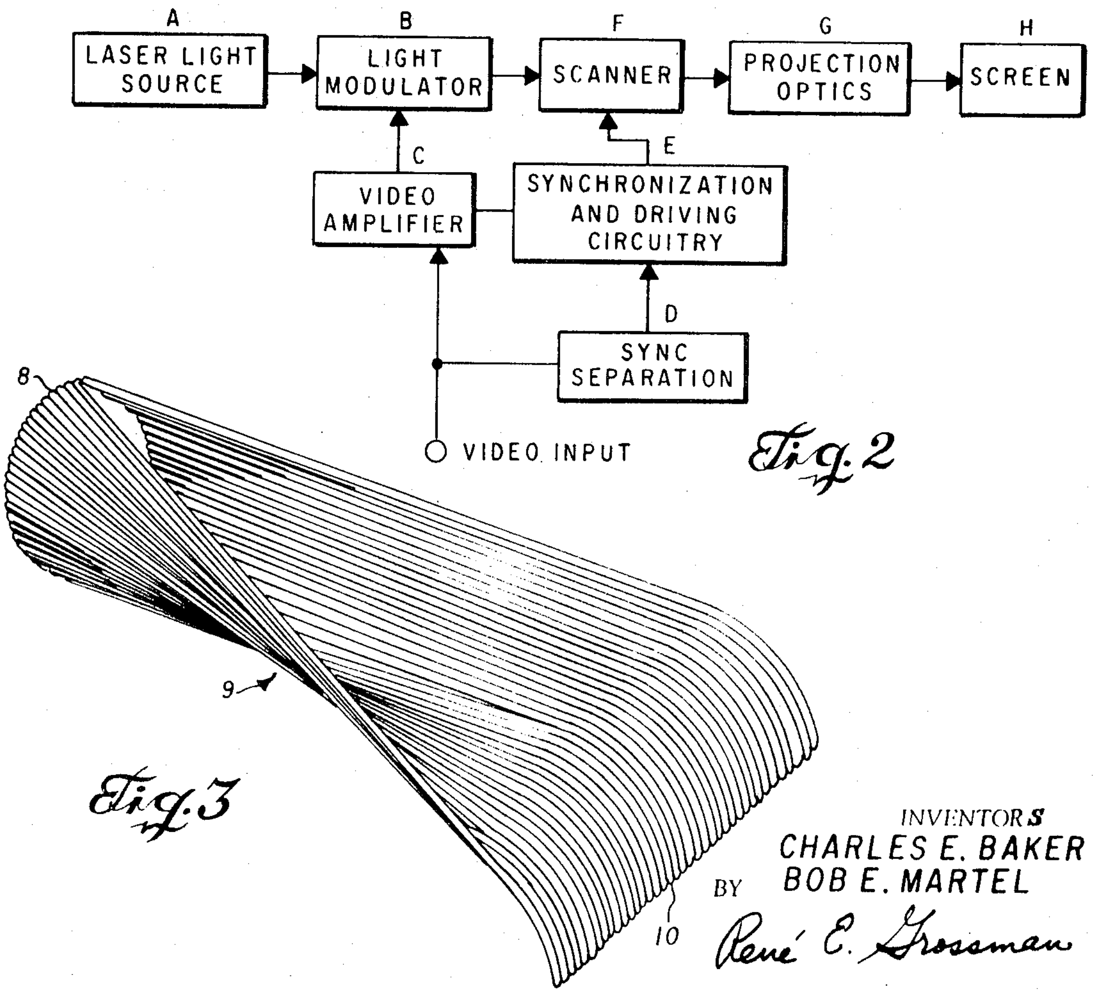
FIG. 2 is a functional block diagram of the display system.
FIG. 3 is a fiber bundle used in the optical transmission of light.

FIG. 2 is a block diagram of the laser display system. A light beam generated within the laser A is modulated by modulator B. The modulator is driven by a video amplifier C which amplifies the video input signal to a level suitable for acting upon the modulator. The modulated light beam is then transformed into horizontal segments by the scanner F and projected by the projection optics G onto a screen H. The video input signal includes a synchronization pulse which is used in synchronizing the horizontal and vertical scanners. The sync pulse is separated from the video signal by the sync separation circuitry D and applied to the synchronization and driving circuitry E. Responsive to the signal from the synchronization and driving circuitry, the horizontal and vertical scanners operate synchronously to change the modulated light beam into modulated line segments which are combined to form a display.

There are three basic types of lasers; solid-state gaseous and semiconductor injection. Although all three can be operated continuously only the gas laser can be operated continuously without employing cryogenic cooling techniques.

Since the laser beam is monochromatic, the use of a single laser will produce a projection in one color. The neon-helium gas laser produces a ruby-red light, as does the krypton laser. Blue and green lights may be produced by an argon laser. Full color displays are possible by combining the output of three lasers; a neon-helium or krypton laser producing a red light, and two different argon lasers producing blue and green light, the combination of the three producing white light or any color combination thereof.

One particular laser used in producing a display system was a 50- milliwatt helium-neon gas laser model 125 produced by Spectra-Physics, Mountain View, California The resonator mirrors and plasma tube of the laser were mounted on a rigid structure with suitable adjustments to allow easy alignment. Radiofrequency excitation was used in addition to DC excitation in increase the power output by 25 percent. The hemispherical resonator was operated in the uniphase or TEM mode. Other modes were discriminated against by proper mirror orientation. All the power was taken out of the spherical end by using a flat mirror on the opposite end with a extremely high reflectivity. The power output of the laser was not necessarily a limiting factor; however, the larger the projection and the greater the intensity, the greater the power the laser would have to produce.

Light modulator B, FIG. 2 was made of two matched pieces of 45°Z-cut KDP oriented at a 90° angle for temperature compensation. This modulator is disclosed in patent application, Ser. No. 371,053, filed May 28, 1964, now U.S. Pat. No. 3,402,002 and assigned to the same assignee as the present application. A modulator of this type can be operated at 75 percent modulation efficiency over a 5-megacycle bandwidth with 600-B. peak voltage with a contrast of greater than 100 to 1. In the operation of the modulator, the collimated polarized light from the Ne-He laser passes down the axis of the modulator crystal and an electric field is applied to the modulator, producing elliptical polarization of the emerging light.

Figure 4:
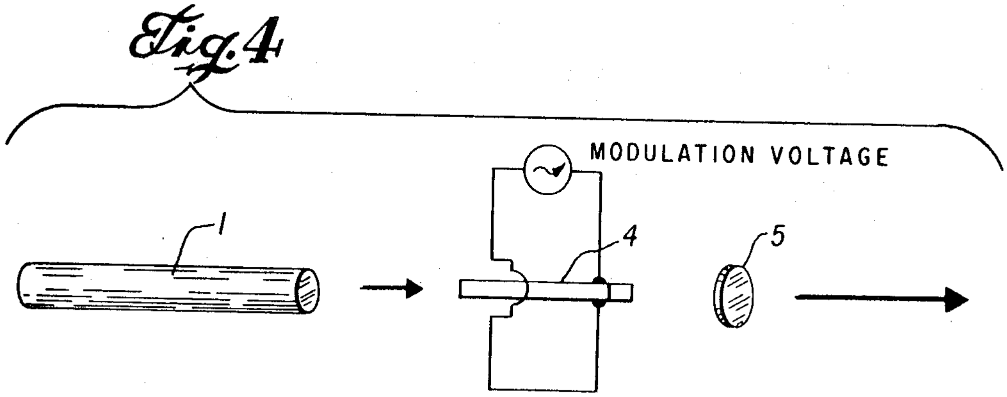
FIG. 4 is a diagram showing the light modulation and optical system.

FIG. 4 shows the laser, modulator and polarizer. The linearly polarized light from the laser 1 passes through the modulator 4 and emerges with a variable amount of elliptical polarization due to the modulating of the light beam. A polarizer 5, oriented perpendicular to the input polarized light, converts the varying elliptically polarized light into linearly polarized amplitude-modulated light. By selecting an initial bias voltage, almost no light is allowed to pass through the modulator. A good polarizer may have a transmission as low as $10^{16}$ in the crossed-axis condition. A video signal applied to the modulator can then allow from 0 to nearly 100 percent of the incident light to pass through the modulator.

The video amplifier, block C along with the synchronization and driving circuitry, block E, and sync separator, block D, are all conventional circuitry as used in present-day television systems. The high-level video amplifier C drives the light modulator B while the synchronization circuitry E is necessary to form a stable display and provide suitable driving waveforms for the light beam scanner F. The video amplifier should supply 500 volts or more peak voltage to the light modulator from a 1.5-volt video input. A two-stage video amplifier of conventional design is used with DC restoration to provide the highest possible quality display.

Figure 5:
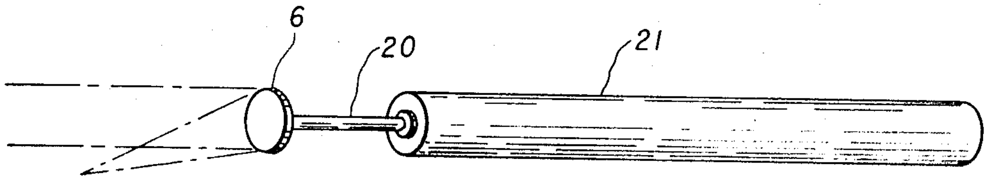
FIG. 5 is a drawing depicting a circular resonance scanner.

The projection optics, blocks F and G, include the horizontal scanner, the fiber optic device, and the vertical scanner. The horizontal scanner's primary function is to convert the light beam into a circular trace. It is well known that various patterns may be generated by selecting combinations of voltages which have differing phase relationships. One example of this is the lissajous patterns which may be generated on the face of an oscilloscope. By combining two sinusoidal waves of equal magnitude, 90° out of phase, a circle may be generated. Using this principle, the scanner in FIG. 5 was developed. The horizontal scanner consists primarily of a piezoelectric transducer driver 21, a resonant fiber 20 and a mirror 6. The piezoelectric transducer drives the resonant fiber, which has a mirror 6 attached to the end thereof. The resonant fiber acts as a mechanical transformer amplifying the deflection of the transducer caused by applying two sinusoidal signals 90° out of phase to the transducer. The transformed motion causes the mirror to rotate in a circular mode.

The transducer is a standard lead titanate zirconate (PZT) piezoelectric transducer such as Clevite No. 60099, and the resonant fiber is, for example, a 0.010-inch diameter quartz rod. The mirror is a 0.050 -inch diameter circular concave mirror.

The horizontal scanner is not limited to a piezoelectric transducer. A mirror may be suspended upon two wires placed 90° to each other. By placing the suspended mirror in a magnetic field and driving both wires with two sinusoidal currents 90° out of phase, the mirror is deflected substantially in a plane in such a manner as to produce a circular scan.

The light beam impinging on the mirror 6 is therefore converted into a circular pattern which is projected upon the end 8 of the fiber optic device 9. The fiber optic device 9 is shown in FIG. 3. The function of the device is to provide a scan rectification to convert the circular light pattern projected from the horizontal scanner into a linear sweep with near-zero flyback time. Light impinging on one end of a fiber within the fiber optic device will be radiated through the fiber and be emitted at the other end. Interference between fibers by light of one fiber radiating into the other is eliminated by coating each fiber with an opaque material. The fiber optic assembly 9 consists of a layer of optical fibers flat at one end and bent to form a circular array 8 at the opposite end. The unit is constructed from multifiber ribbons. A multifiber may consist of, for example, a 6×6 array of optically distinct 10- micron coated fibers fused into a single strand. These strands are then cemented side by side to form a ribbon. A number of ribbons are clamped together to form the linear end, and the circular end is formed by wrapping the ribbons around a tube end securing them with a shrink-fit plastic sleeving. After potting with epoxy ribbon, the scan converter is completed by polishing the ends. Various means of fabricating the fiber optic may be utilized, but the above-mentioned means has been found to be the simplest. The shape is not limited to the one shown in the FIGS. of the drawings, but may be formed into any required configuration.

The linear sweep projection from the end 10 of the fiber optic device 9 is projected onto mirror 11 of the vertical scanner. One basic configuration of this scanner is shown in FIG. 1.

In the development of the vertical scanner, both piezoelectric and electromagnetic devices were used. One approach was to reflect the beam vertically with a piezoelectric driven mirror, in which two bimorph piezoelectric transducers were used as flexture elements for the driving mirror 11.

Figure 6:
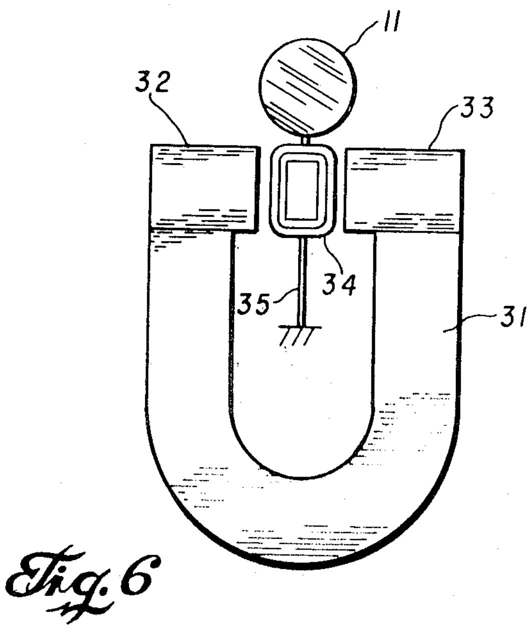
FIG. 6 is a drawing of a galvanometer light beam scanner.

The scanner used in this embodiment of the invention was a galvanometer light beam device as shown in FIG. 6. Therein depicted is a magnet 31 having pole pieces 32 and 33. Between the pole pieces is coil 34, which is a suspended torsion wire 35, thus eliminating the need for bearings. Mounted upon the coil and extending therefrom is the mirror 11. This mirror receives the light from the end 10 of fiber optic device 9 and projects it through a projection lens 12 to produce the vertical scan. The mirror oscillates back and forth projecting each line of the horizontal scan onto the screen. This method of achieving a linear trace with rapid flyback works quite well with the present system. A flyback time of less than 1 millisecond together with a deflection of greater than 10° has been possible with small mirrors. The galvanometer is driven with positive and negative current pulses combined with a sawtooth waveform.

Although the present invention has been shown and illustrated in terms of specific preferred embodiments, it will be apparent that changes and modifications are possible without departing from the spirit and scope of the invention as defined in the appended claims.

What is claimed is:

1. In a projection system including substantially diffraction-limited optical means for transforming a modulated laser light beam operating in the uniphase mode into successive horizontal traces, said optical means having an aperture sized to pass substantially only the uniphase mode of said light beam and comprising the combination of a mirror driven so as to project said modulated light beam into a series of circular traces, a fiber optic device for receiving said circular traces of modulated light and transforming them into a series of horizontal line segments of modulated light, and an oscillating vertical scan mirror for receiving said horizontal line segments and projecting them in spaced relationship with each other to form a display.

2. A display system comprising in combination
laser means operable in the uniphase mode for emitting a visible light beam,
a substantially diffraction-limited optical system having an aperture sized to pass substantially only the uniphase mode of said light beam which includes
means for modulating said light beam,
a horizontal scanner to convert said modulated light beam into a circular pattern,
a fiber optic device to transform said circular pattern into a linear horizontal trace, and
a vertical scanner to project successive horizontal traces in a spaced relationship to each other to form a display.

3. A display system comprising in combination laser means operable in the uniphase mode for emitting a visible light beam,
means for modulating said light beam,
a substantially diffraction-limited optical system having an aperture sized to pass substantially only the uniphase mode of said light beam which includes
a horizontal scanner to convert said modulated light beam into a circular pattern,
a fiber optic device to transform said circular pattern into a linear horizontal trace, and
a vertical scanner to project successive horizontal traces in a spaced relationship to each other to form a display.

4. A display system comprising in combination laser means operable in the uniphase mode for producing a visible light output having at least two colors,
   a substantially diffraction-limited optical system having an aperture sized to pass substantially only the uniphase mode of said light output which includes
   means for modulating said light output,
   a horizontal scanner to convert said modulated light output into a circular pattern,
   a fiber optic device to transform said circular pattern into a linear horizontal trace, and
   a vertical scanner to project said successive horizontal traces in a spaced relationship to each other to form a color display.

5. A display system comprising in combination
   laser means operable in the uniphase mode for producing a visible light output having at least two colors,
   means for modulating said light output in accordance with video signals,
   a substantially diffraction-limited optical system having an aperture sized to pass substantially only the uniphase mode of said light output which includes
   a horizontal scanner to convert said modulated light output into a circular pattern,
   a fiber optic device to transform said circular pattern into a linear horizontal trace, and
   a vertical scanner to project said successive horizontal traces in a spaced relationship to each other to form a color display.

* * * * *